US012333989B1

(12) United States Patent
Lin et al.

(10) Patent No.: US 12,333,989 B1
(45) Date of Patent: Jun. 17, 2025

(54) DISPLAY PANELS AND MOBILE TERMINALS

(71) Applicant: Shenzhen China Star Optoelectronics Semiconductor Display Technology Co., Ltd., Guangdong (CN)

(72) Inventors: Yunpeng Lin, Guangdong (CN); Yingchun Zhao, Guangdong (CN)

(73) Assignee: Shenzhen China Star Optoelectronics Semiconductor Display Technology Co., Ltd., Shenzhen (CN)

(*) Notice: Subject to any disclaimer, the term of this patent is extended or adjusted under 35 U.S.C. 154(b) by 0 days.

(21) Appl. No.: 18/401,388

(22) Filed: Dec. 30, 2023

(30) Foreign Application Priority Data

Dec. 5, 2023 (CN) ......................... 202311666873.1

(51) Int. Cl.
*G09G 3/20* (2006.01)
*G09G 3/3266* (2016.01)
*G09G 3/36* (2006.01)

(52) U.S. Cl.
CPC ......... *G09G 3/2092* (2013.01); *G09G 3/3266* (2013.01); *G09G 3/3674* (2013.01); *G09G 2310/0267* (2013.01); *G09G 2310/0286* (2013.01)

(58) Field of Classification Search
CPC .. G09G 3/2092; G09G 3/3266; G09G 3/3674; G09G 2310/0267; G09G 2310/0286
USPC ........................................................... 345/55
See application file for complete search history.

(56) References Cited

U.S. PATENT DOCUMENTS

2013/0088483 A1* 4/2013 Abe ........................ G11C 19/28 345/213
2020/0027939 A1* 1/2020 Cho ...................... G09G 3/3266
2020/0074936 A1* 3/2020 Chu ...................... G09G 3/3291
2020/0258437 A1* 8/2020 Zhao ......................... G09G 3/20
2021/0057502 A1* 2/2021 Kim ..................... H01L 27/1251
2021/0265391 A1* 8/2021 Nakagawa ........... G09G 3/3677
2022/0309990 A1* 9/2022 Qiu ...................... G09G 3/2092
2023/0154384 A1* 5/2023 Wang ........................ G09G 3/32 345/55
2024/0021122 A1* 1/2024 Li ............................ G09G 3/20
2024/0038115 A1* 2/2024 Wan .......................... G09G 3/20
2024/0038193 A1* 2/2024 Lv ......................... G09G 3/3677
2024/0119913 A1* 4/2024 Shi ........................... G09G 3/32
2024/0127732 A1* 4/2024 Xie ........................... G09G 3/20

* cited by examiner

*Primary Examiner* — Tom V Sheng
(74) *Attorney, Agent, or Firm* — PV IP PC; Wei Te Chung

(57) ABSTRACT

A display panel and a mobile terminal are disclosed. The display panel includes a gate driving circuit, the gate driving circuit includes a first driving transistor and a second driving transistor disposed along a second direction, the first driving transistor includes a first source and a first drain, the second driving transistor includes a second source and a second drain, the first source and the second source are connected to a same control node. The first source, the first drain, the second source and the second drain are disposed side by side along the first direction, the first source and the second source are disposed between the first drain and the second drain, and the first source and the second source at least partially overlap in the second direction.

20 Claims, 4 Drawing Sheets

DISPLAY PANELS AND MOBILE TERMINALS

CROSS-REFERENCE TO RELATED APPLICATION

This application claims priority to and the benefit of Chinese Patent Application No. 202311666873.1, filed on Dec. 5, 2023, the disclosure of which is incorporated herein by reference in its entirety.

TECHNICAL FIELD

The present disclosure relates to display technologies, and in particular, to display panels and mobile terminals.

BACKGROUND

In existing display products, such as liquid crystal displays, organic light emitting displays, and mini light emitting diode (LED) and micro LED displays, a gate driving circuit, also referred to as a gate on array (GOA) circuit, is generally used to transmit gate driving signals to sub-pixels in a display area, so as to control the light emission of the sub-pixels.

At present, driving architectures commonly used in a gate driving circuit include three-dimensional transistor (Tri-Gate) driving architecture and data line sharing (DLS) driving architecture. Compared with conventional driving architectures, these two driving architectures can save a certain amount of cost, however, the increase in the number of stages of corresponding GOA units makes a longitudinal dimension of the gate driving circuit too large.

SUMMARY

The embodiments of the present disclosure provide a display panel, the display panel includes a display portion and a gate driving circuit disposed along a side of the display portion, the gate driving circuit includes N gate on array (GOA) units in cascade, the N GOA units are arranged along a first direction. Each of the N GOA units includes a first driving transistor and a second driving transistor disposed adjacently along a second direction. The first driving transistor includes a first gate, a first source and a first drain, the second driving transistor includes a second gate, a second source and a second drain, the first gate and the second gate are connected to a first control node, and the first source and the second source are connected to a second control node. The first source, the first drain, the second source and the second drain are disposed along the first direction, and the first source and the second source are disposed between the first drain and the second drain. The first source and the second source at least partially overlap in the second direction, and an included angle between the second direction and the first direction is greater than 0° and less than or equal to 90°.

The embodiments of the present disclosure further provide a mobile terminal, and the mobile terminal includes the display panel described above.

BRIEF DESCRIPTION OF THE DRAWINGS

With reference to the accompanying drawings, technical solutions and other beneficial effects of the present disclosure will be apparent through the detailed description of specific embodiments of the present disclosure.

DETAILED DESCRIPTION

Figure 1:
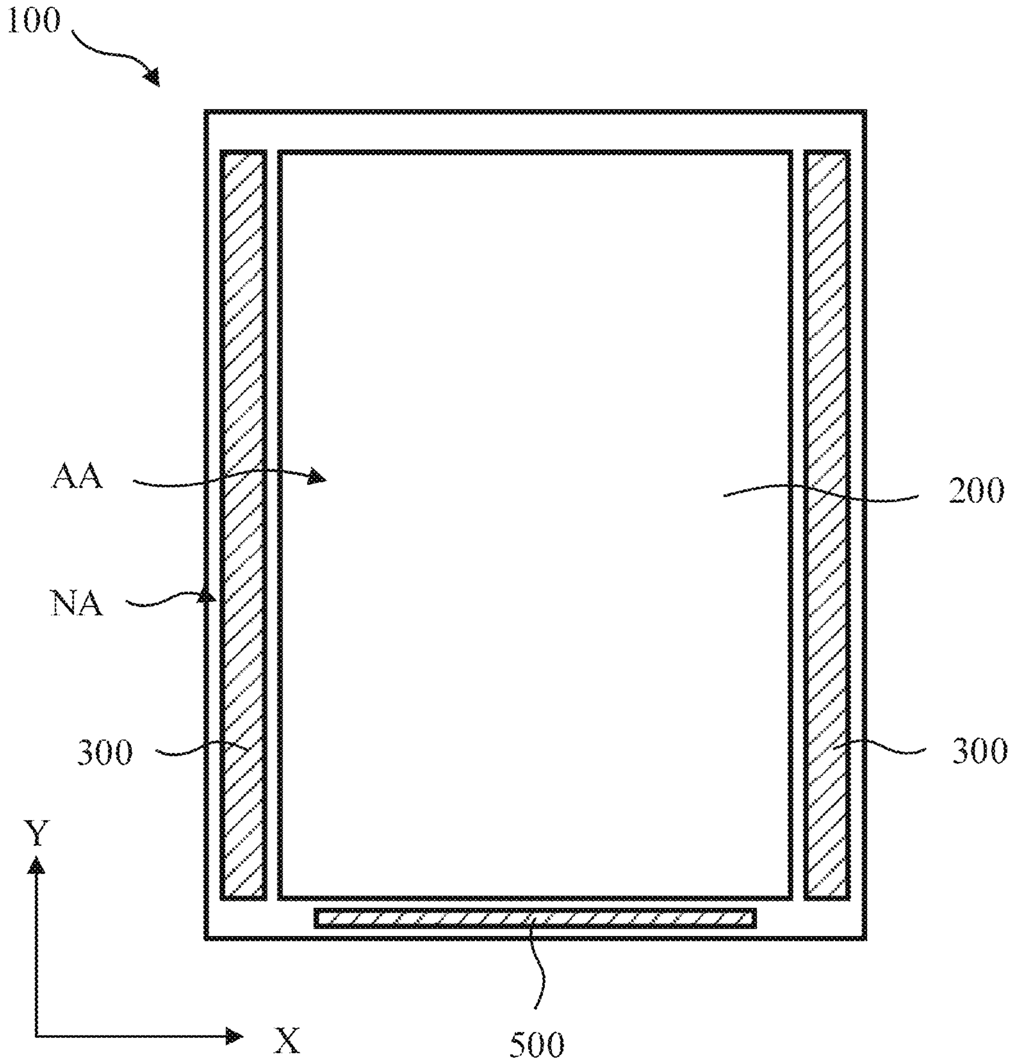
FIG. 1 is a diagram of a structure of a display panel provided by some embodiments of the present disclosure.

Technical solutions in embodiments of the present disclosure will be clearly and completely described below with reference to the accompanying drawings in the embodiments of the present disclosure. It is apparent that the embodiments described herein are only a part of the embodiments of the present disclosure, but not all of the embodiments of the present disclosure. Based on the embodiments in the present disclosure, all other embodiments obtained by those skilled in the art without making creative efforts fall within the scope of protection of the present disclosure.

Beneficial effects of the present disclosure: the present disclosure discloses a display panel and a mobile terminal. The display panel includes a gate driving circuit, the gate driving circuit includes a first driving transistor and a second driving transistor disposed along a second direction, the first driving transistor includes a first source and a first drain, the second driving transistor includes a second source and a second drain, the first source and the second source are connected to a same control node. The first source, the first drain, the second source and the second drain are disposed side by side along the first direction, and the first source and the second source are disposed between the first drain and the second drain, the first source and the second source at least partially overlap in the second direction. The present disclosure reduces the dimensions of the first driving transistor and the second driving transistor in the first direction by making the first source and the second source at least partially overlap in the second direction, so as to reserve a part of longitudinal space to arrange other devices, and thereby addressing the technical problem that the gate driving circuit occupies an excessive longitudinal dimension in the display panel.

Referring to FIG. 1 to FIG. 5, the present disclosure provides a display panel 100. The display panel 100 may include a display portion 200 and at least one gate driving circuit 300. The gate driving circuit 300 includes N GOA units 400 in cascade, the N GOA units 400 are arranged along a first direction Y, and the display portion 200 and the gate driving circuit 300 are arranged along the second direction X.

In this embodiment, each of the N GOA units 400 may include a first driving transistor and a second driving transistor disposed adjacently, and the first driving transistor and the second driving transistor are arranged along the second direction X.

In this embodiment, the first driving transistor T52 includes a first gate 210, a first source 220 and a first drain 230, and the second driving transistor T62 includes a second gate 310, a second source 320 and a second drain 230. The first gate 210 and the second gate 310 are connected to a first control node Q, and the first source 220 and the second source 320 are connected to a second control node G.

Figure 4:
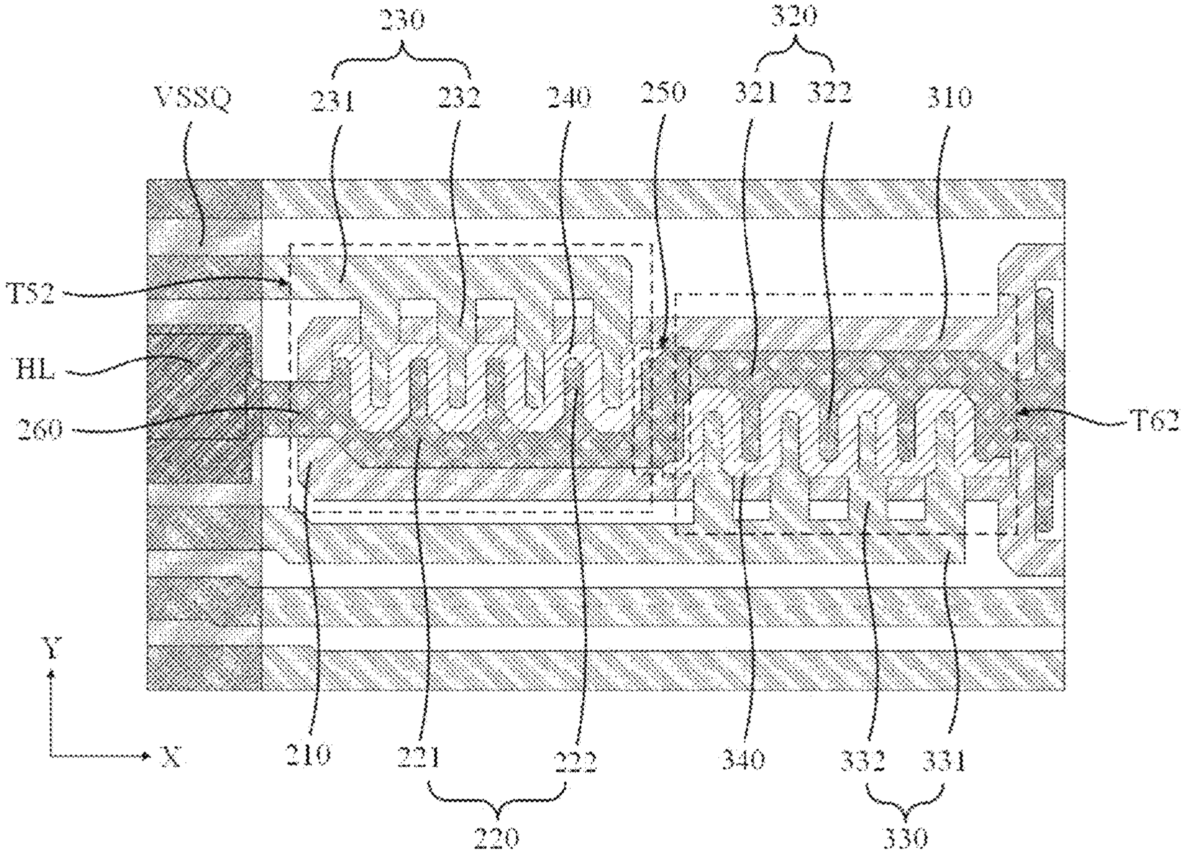
FIG. 4 is a diagram of a stacked structure of film layers of a first driving transistor and a second driving transistor in a GOA unit provided by some embodiments of the present disclosure.

In this embodiment, the second control node G may be connected to a low potential line or a high potential line. For example, as shown in FIG. 4, the second control node G is connected to a first low potential line VSSQ.

In this embodiment, the first source 220, the first drain 230, the second source 320 and the second drain 330 are disposed along the first direction Y, the first source 220 and the second source 320 are disposed between the first drain 230 and the second drain 330, and the first source 220 and the second source 320 at least partially overlap in the second direction X.

The present disclosure reduces the dimensions of the first driving transistor and the second driving transistor in the first direction Y by making the first source 220 and the second source 320 at least partially overlap in the second direction X, so as to reserve a part of longitudinal space to arrange other devices, and thereby addressing the technical problem that the gate driving circuit 300 occupies an excessive longitudinal dimension in the display panel 100. The longitudinal direction in the present disclosure may be a same direction as the first direction Y.

It should be noted that an included angle between the second direction X and the first direction Y is greater than 0° and less than or equal to 90°. For example, the second direction X and the first direction Y may be perpendicular to each other, the first direction Y may be parallel to a data line of the display panel 100, and N is a positive integer.

It should be noted that the first driving transistor further includes a first channel 240, and the second driving transistor further includes a second channel 340. In the second direction X, the first channel 240 and the second channel 340 at least partially overlap.

In this embodiment, each GOA unit 400 may include a pull-up control module 410, a pull-up module 420, a pull-down module 430, and a pull-down holding module 440. The pull-up control module 410, the pull-up module 420, the pull-down module 430, and the pull-down holding module 440 are all connected to the first control node Q. The first driving transistor and the second driving transistor may be two transistors in any one of the pull-up control module 410, the pull-up module 420, the pull-down module 430 and the pull-down holding module 440.

Alternatively, the display portion 200 may include a plurality of sub-pixel units, at least one pixel circuit is disposed in each of the plurality of sub-pixel units. The first driving transistor and the second driving transistor may be disposed in the at least one pixel circuit, so as to reduce the space occupied by a driving transistor in the pixel circuit in each of the plurality of sub-pixel units.

In this embodiment, the first driving transistor T52 and the second driving transistor T62 are disposed in the pull-down holding module 440, and the first driving transistor T52 and the second driving transistor T62 are connected to the first control node Q. The present disclosure reduces the channel widths of the first driving transistor T52 and the second driving transistor T62 connected to the first control node Q, that is, the present disclosure reduces the dimensions of the first driving transistor T52 and the second driving transistor T62 in the second direction X, so that the first source 220 and the second source 320 can at least partially overlap in the second direction X, so as to reduce the dimensions of the first driving transistor T52 and the second driving transistor T62 in the first direction Y, which reserves a part of longitudinal space to arrange other devices, thereby addressing the technical problem that the gate driving circuit 300 occupies an excessive longitudinal dimension in the display panel 100.

Technical solutions of the present disclosure will now be described with reference to a specific embodiment, in which the first driving transistor T52 and the second driving transistor T62 disposed in the pull-down holding module 440 is taken as an example.

Referring to FIG. 1, the display panel 100 includes a display area AA and a non-display area NA disposed adjacently to the display area AA, and a display portion 200 is provided in the display area AA. Optionally, the non-display area NA surrounds the display area AA, so that the display area AA is surrounded by the non-display area NA. The display area AA is an area in the display panel 100 used to realize a display function, and a plurality of display units for realizing the display function are disposed inside the display area AA. The non-display area NA may be a frame area of the display panel 100, and functional components may be disposed inside the non-display area NA to assist the display units in the display area AA for display.

Referring to FIG. 1, a bonding terminal 500 is disposed at a lower side of the display area AA. The bonding terminal 500 may be connected to an external circuit, and the bonding terminal 500 transmits signals input by the external circuit to a data wiring, thereby driving the display panel 100 to display an image. For example, the bonding terminal 500 may be bonded and connected to a chip or a flexible circuit board to provide power and driving signals to the display panel 100.

In this embodiment, at least one gate driving circuit 300 is disposed in the non-display area NA, and the at least one gate driving circuit 300 may be disposed at both sides of the display area AA. The gate driving circuit 300 may include N GOA units 400 in cascade, and the N GOA units 400 may be arranged along the first direction Y. Any one of the GOA units 400 may have various structures, such as the circuit structure in FIG. 2.

Figure 2:
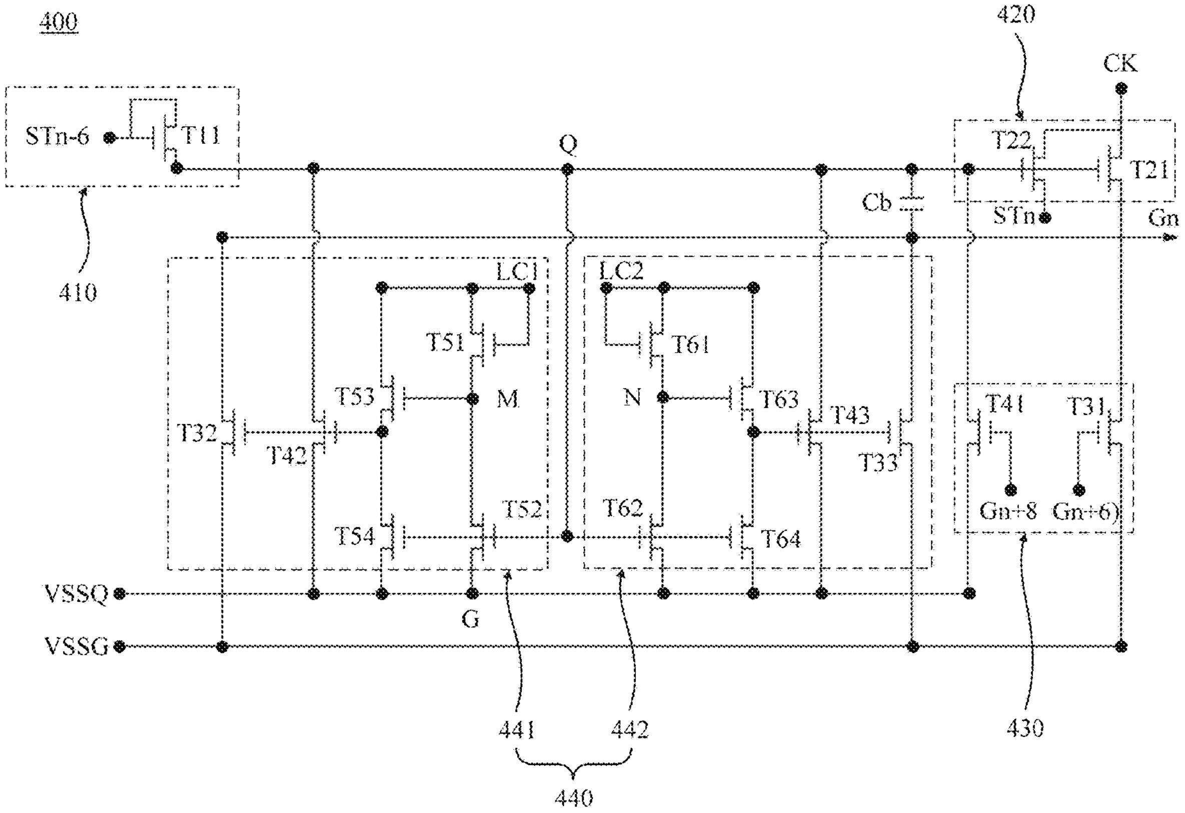
FIG. 2 is a diagram of a circuit structure of a GOA unit in a display panel provided by some embodiments of the present disclosure.

Taking the structure of FIG. 2 as an example, each GOA unit 400 may include a pull-up control module 410, a pull-up module 420, a pull-down module 430, a pull-down holding module 440, and a bootstrap capacitor Cb.

In this embodiment, the pull-up control module includes a pull-up control transistor T11. The gate and the drain of the pull-up control transistor T11 are connected to the stage transmission signal output terminal ST(n−6) of the (n−6)th stage, and the source of the pull-up control transistor T11 is connected to the first control node Q.

In this embodiment, the first terminal of the bootstrap capacitor Cb is connected to the first control node Q, and the second terminal of the bootstrap capacitor Cb is connected to the gate signal terminal Gn of the nth stage and the pull-down holding module 440.

In this embodiment, the pull-up module 420 includes a first pull-up transistor T21 and a second pull-up transistor T22. The gate of the first pull-up transistor T21 is connected to the first control node Q, and the drain of the first pull-up transistor T21 is connected to the clock signal terminal CK, and the source of the first pull-up transistor T21 is connected to the gate signal terminal Gn of the nth stage. The gate of the second pull-up transistor T22 is connected to the first control node Q, the drain of the second pull-up transistor T22 is connected to the clock signal terminal CK, and the source of the second pull-up transistor T22 is connected to the stage transmission signal terminal STn of the nth stage.

In this embodiment, the pull-down module 430 includes a first pull-down transistor T31 and a second pull-down transistor T41. The drain of the first pull-down transistor T31 is connected to the gate signal terminal Gn of the nth stage, and the drain of the second pull-down transistor T41 is connected to the first control node Q. The source of the first pull-down transistor T31 is connected to the second low potential line VSSG, and the source of the second pull-down transistor T41 is connected to the first low potential line VSSQ. The gate of the first pull-down transistor T31 is connected to the gate signal terminal G(n+6) of the (n+6)th stage, and the gate of the second pull-down transistor T41 is connected to the gate signal terminal G(n+8) of the (n+8)th stage.

It should be noted that the potential of the first low potential line VSSQ and the second low potential line VSSG may be equal, or the potential of the first low potential line VSSQ may be less than or greater than the potential of the second low potential line VSSG, and it is not limited in the present disclosure.

In this embodiment, the pull-down holding module 440 may include a first pull-down holding unit 441 and a second pull-down holding unit 442.

The first pull-down holding unit 441 includes a first driving transistor T52, a third driving transistor T54, a fifth driving transistor T51, a seventh driving transistor T53, a ninth driving transistor T42, and an eleventh driving transistor T32. The second pull-down holding unit 442 includes a second driving transistor T62, a fourth driving transistor T64, a sixth driving transistor T61, an eighth driving transistor T63, a tenth driving transistor T43, and a twelfth driving transistor T33.

In this embodiment, the gate and the drain of the fifth driving transistor T51 are connected to the first high-voltage direct current signal terminal LC1, and the source of the fifth driving transistor T51 is electrically connected to the drain of the first driving transistor T52 and the gate of the seventh driving transistor T53. The gate of the first driving transistor T52 is electrically connected to the first control node Q, and the source of the first driving transistor T52 is electrically connected to the first low potential line VSSQ. The drain of the seventh driving transistor T53 is connected to the first high-voltage direct current signal terminal LC1, and the source of the seventh driving transistor T53 is electrically connected to the drain of the third driving transistor T54, the gate of the ninth driving transistor T42, and the gate of the eleventh driving transistor T32. The gate of the third driving transistor T54 is electrically connected to the first control node Q, and the source of the third driving transistor T54 is electrically connected to the first low potential line VSSQ. The source of the ninth driving transistor T42 is electrically connected to the first low potential line VSSQ, and the drain of the ninth driving transistor T42 is electrically connected to the first control node Q. The source of the eleventh driving transistor T32 is electrically connected to the second low potential line VSSG, and the drain of the eleventh driving transistor T32 is electrically connected to the gate signal terminal Gn of the nth stage.

In this embodiment, the gate and the drain of the sixth driving transistor T61 are connected to the second high-voltage direct current signal terminal LC2, and the source of the sixth driving transistor T61 is electrically connected to the drain of the second driving transistor T62 and the gate of the eighth driving transistor T63. The gate of the second driving transistor T62 is electrically connected to the first control node Q, and the source of the second driving transistor T62 is electrically connected to the first low potential line VSSQ. The drain of the eighth driving transistor T63 is connected to the second high-voltage direct current signal terminal LC2, and the source of the eighth driving transistor T63 is electrically connected to the drain of the fourth driving transistor T64, the gate of the tenth driving transistor T43, and the gate of the twelfth driving transistor T33. The gate of the fourth driving transistor T64 is electrically connected to the first control node Q, and the source of the fourth driving transistor T64 is electrically connected to the first low potential line VSSQ. The source of the tenth driving transistor T43 is electrically connected to the first low potential line VSSQ, and the drain of the tenth driving transistor T43 is electrically connected to the first control node Q. The source of the twelfth driving transistor T33 is electrically connected to the second low potential line VSSG, and the drain of the twelfth driving transistor T33 is electrically connected to the gate signal terminal Gn of the nth stage.

Film layers of the display panel 100 in the present disclosure will be described with respect to the structure in FIG. 3.

Figure 3:
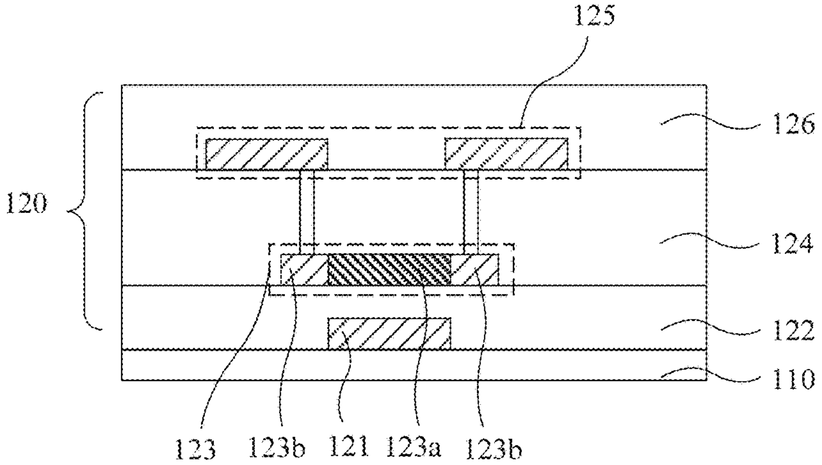
FIG. 3 is a diagram of a stacked structure of a part of film layers in a display panel provided by some embodiments of the present disclosure.

Referring to FIG. 3, both the display area AA and the non-display area NA of the display panel 100 can be provided with a base substrate 110 and an array driving layer 120 disposed on the base substrate 110. The film layer structure in the non-display area NA is mainly described below.

Referring to FIG. 3, the array driving layer 120 may include a plurality of thin film transistors. The thin film transistors may be of an etch-stop type, a back-channel-etch type, or may be divided into structures such as bottom gate thin film transistors, top gate thin film transistors, or the like according to positions of the gate and the active layer 123, or may be divided into N-type thin film transistors and P-type thin film transistors according to the performance of thin film transistors. The structure of the thin film transistor in FIG. 3 does not represent the structural diagram of any transistor in FIG. 2, but is merely a schematic diagram of each film layer of the display panel 100 in the present disclosure.

Referring to FIG. 3, the array driving layer 120 may include a gate layer 121 disposed on the base substrate 110, a gate insulating layer 122 disposed on the gate layer 121, an active layer 123 disposed on the gate insulating layer 122, an inter-insulating layer 124 disposed on the active layer 123, a source and drain layer 125 disposed on the inter-insulating layer 124, and a passivation layer 126 disposed on the source and drain layer 125.

In this embodiment, the gate insulating layer 122, the inter-insulating layer 124 and the passivation layer 126 are mainly used to isolate the electrical connection between the upper metal structure and the lower metal structure. The materials of the gate insulating layer 122, the inter-insulating layer 124 and the passivation layer 126 may include a compound composed of nitrogen element, silicon element and oxygen element, for example, a single layer of silicon oxide film layer, or a stacked structure of silicon oxide and silicon nitride.

In this embodiment, the active layer 123 may include a channel 123*a* and doped portions 123*b* disposed at both sides of the channel. The material of the active layer 123 may be one of oxide semiconductor, amorphous silicon or low-temperature polycrystalline silicon, and the material of the active layer 123 in the present disclosure may be an indium gallium zinc oxide semiconductor.

In this embodiment, the gate layer 121 may include a gate, a scanning line and a voltage transmission line. The source and drain layer 125 may include a source, a drain and a data line. The materials of the gate layer 121 and the source and drain layer 125 may be copper, molybdenum or molybdenum-titanium alloy.

It should be noted that the structure of the thin film transistor in FIG. 3 is only one of the structures listed in the present disclosure, and other structures of thin film transistors are also applicable to the present disclosure.

Technical solutions of the present disclosure will be described below with reference to the structures of the first driving transistor T52 and the second driving transistor T62.

Referring to FIG. 4, the first drain 230 is connected to the first internal node M of the pull-down holding module 440, and the second drain 330 is connected to the second internal node N of the pull-down holding module 440.

Referring to FIG. 4, the first source 220 includes a first trunk source 221 and a plurality of first branch sources 222 connected to the first trunk source 221 and spaced apart. The second source 320 includes a second trunk source 321 and a plurality of second branch sources 322 connected to the second trunk source 321 and spaced apart. The first trunk source 221 and the second trunk source 321 extend along the second direction X, the plurality of first branch sources 222 and the plurality of second branch sources 322 extend along the first direction Y, and the first branch sources 222 and the second branch sources 322 are oriented in two different directions.

Referring to FIG. 4, the first source 220 and the second source 320 are disposed side by side along the second direction X. The GOA unit 400 further includes a source connecting portion 250 extending along the first direction Y The source connecting portion 250 is disposed between the first source 220 and the second source 320, the first end of the source connecting portion 250 is electrically connected to the end of the first trunk source 221 close to the plurality of second branch sources 322, and the second end of the source connecting portion 250 is electrically connected to the end of the second trunk source 321 close to the plurality of first branch sources 222.

In this embodiment, the first trunk source 221 and the second trunk source 321 are disposed in parallel and are not on a same straight line. The plurality of first branch sources 222 and the plurality of second branch sources 322 are electrically connected to the corresponding trunk source, respectively. The plurality of first branch sources 222 are oriented towards the extension section of the line section where the second trunk source 321 is located, and the plurality of second branch sources 322 are oriented towards the extension section of the line section where the first trunk source 221 is located. The plurality of first branch sources 222 are spaced apart along the second direction X, and the plurality of second branch sources 322 are spaced apart along the second direction X. The first trunk source 221 and the plurality of first branch sources 222 are all located at the first side of the source connecting portion 250, and the second trunk source 321 and the plurality of second branch sources 322 are all located at the second side of the source connecting portion 250. That is, the first source 220 and the second source 320 are separated apart by the source connecting portion 250 of the present disclosure, so that the first source 220 and the second source 320 that are oppositely disposed in the first direction Y are changed to be disposed side by side in the second direction X, which reduces the dimensions occupied by the first source 220 and the second source 320 in the first direction Y and reserves a part of longitudinal space to arrange other devices, thereby addressing the technical problem that the gate driving circuit 300 occupies an excessive longitudinal dimension in the display panel 100.

Referring to FIG. 4, the first drain 230 includes a first trunk drain 231 and a plurality of first branch drains 232 connected to the first trunk drain 231 and spaced apart, and the second drain 330 includes a second trunk drain 331 and a plurality of second branch drains 332 connected to the second trunk drain 331 and spaced apart. The first trunk drain 231 and the second trunk drain 331 extend along the second direction X, the plurality of first branch drains 232 extend from the first trunk drain 231 towards the first trunk source 221, and the plurality of second branch drains 332 extend from the second trunk drain 331 towards the second trunk source 321.

In this embodiment, the plurality of first branch drains 232 and the plurality of first branch sources 222 are alternately disposed and sequentially spaced apart, and the first channel 240 covers the gap between the plurality of first branch drains 232 and the plurality of first branch sources. The plurality of second branch drains 332 and the plurality of second branch sources 322 are alternately disposed and sequentially spaced apart, and the second channel 340 covers the gap between the plurality of second branch drains 332 and the plurality of second branch sources 322.

In this embodiment, the first trunk source 221 and the plurality of first branch sources 222 are enclosed to form multiple U-shaped structures, the plurality of first branch drains 232 extend into corresponding U-shaped structures, and the plurality of first branch drains 232 and the plurality of first branch sources 222 are spaced apart. The second trunk source 321 and the plurality of second branch sources 322 are enclosed to form multiple U-shaped structures, the plurality of second branch drains 332 extend into corresponding U-shaped structures, and the plurality of second branch drains 332 and the plurality of second branch sources 322 are spaced apart. In this embodiment, the distance between two adjacent first branch drain 232 and the first branch source 222 may be equal to the distance between two adjacent second branch drain 332 and the second branch source 322.

At the same time, the first channel 240 may be disposed between the plurality of first branch drains 232 and the plurality of first branch sources 222, and the second channel 340 may be disposed between the plurality of second branch drains 332 and the plurality of first branch sources 322. Both the first channel 240 and the second channel 340 may have a continuous channel structure, and doped portions located at both sides of the first channel 240 and the second channel 340 may overlap the adjacent branch sources and branch drains.

In this embodiment, the first channel 240 and the second channel 340 may be in a shape of continuous wave.

Referring to FIG. 4, both the first gate 210 and the second gate 310 extend along the second direction X, orthographic projections of the first channel 240, the first source 220 and a part of the first drain 230 on the first gate 210 are within the first gate 210, and orthographic projections of the second channel 340, the second source 320 and a part of the second drain 330 on the second gate 310 are within the second gate 310.

In this embodiment, the first gate 210 and the second gate 310 are disposed on the entire surface, and the first gate 210 and the second gate 310 are electrically connected to each other, that is, the first gate 210 and the second gate 310 are completely covering the first channel 240 and the second channel 340 correspondingly, which improves the driving force exerted by the first gate 210 and the second gate 310 on the corresponding channel, and improves the conduction rate of the first driving transistor T52 and the second driving transistor T62.

Referring to FIG. 4, in the first direction Y, the width dimension of the source connecting portion 250 is greater than the width dimension of any one of the first branch sources 222, and the width dimension of the source connecting portion 250 is greater than the width dimension of any one of the second branch sources 322. The first source 220 and the second source electrode 320 are connected through the source connecting portion 250, in order to prevent the source connecting portion 250 from breaking, the width dimension of the source connecting portion 250 in the present disclosure is larger than the width dimensions of the first branch source 222 and the second branch source 232. At the same time, the source connecting portion 250 is provided with a first channel 240 and a second channel 340, and in order to avoid short circuit between the first channel 240 and the second channel 340, it is also required that the width dimension of the source connecting portion 250 is larger than the width dimensions of the first branch source 222 and the second branch source 322. It should be noted that the width dimensions of the source connecting portion 250, the first branch source 222, and the second branch source 322 in the first direction Y refer to the dimensions of the source connecting portion 250, the first branch source 222, and the second branch source 322 extending in the second direction X, respectively.

Referring to FIG. 4, the first low potential line VSSQ is disposed at a side of the first driving transistor T52 away from the second driving transistor T62, and the first low potential line VSSQ extends along the first direction Y. At the same time, the display panel 100 further includes a connecting section 260. The first terminal of the connecting section 260 is electrically connected to the first trunk source 221 in the first source 220, and the second terminal of the connecting section 260 can pass through the electrical connecting hole HL to be electrically connected to the first low potential line VSSQ.

In this embodiment, the first low potential line VSSQ may be disposed on the same layer as the first gate 210 and the second gate 310. That is, the first low potential line VSSQ can be formed by the same metal layer in the same mask process as the first gate 210 and the second gate 310, which saves wiring space while simplifying the process.

Figure 5:
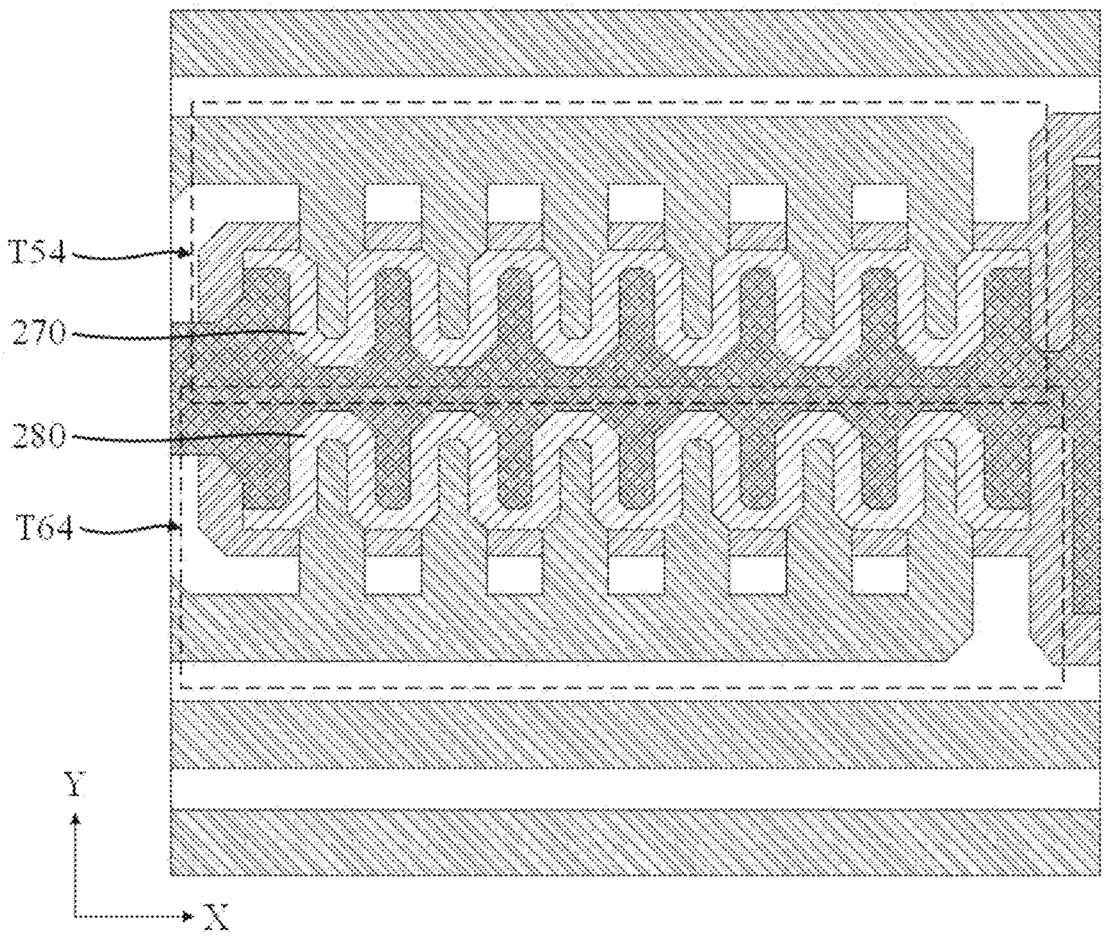
FIG. 5 is a diagram of a stacked structure of film layers of a third driving transistor and a fourth driving transistor in a GOA unit provided by some embodiments of the present disclosure.

Referring to FIG. 5, the pull-down holding module 440 further includes a third driving transistor T54 and a fourth driving transistor T64 connected to the first control node Q. The third driving transistor T54 and the fourth driving transistor T64 are disposed adjacently along the first direction Y, and the third driving transistor T54 and the fourth driving transistor T64 are disposed at the side of the second driving transistor T62 away from the first driving transistor T52. That is, the structure shown in FIG. 5 can be disposed at the right side in FIG. 4. The sources of the first driving transistor T52, the second driving transistor T62, the third driving transistor T54 and the fourth driving transistor T64 can be directly connected, and the gates of the above four transistors can also be connected directly.

At the same time, the third driving transistor T54 includes a third channel 270, the fourth driving transistor T64 includes a fourth channel 280, and the third channel 270 and the fourth channel 280 are disposed oppositely along the first direction Y.

In this embodiment, the first driving transistor T52 and the second driving transistor T62 are changed from being disposed oppositely in the first direction Y to being disposed side by side in the second direction X, which reduces the dimensions occupied by the first driving transistor T52 and the second driving transistor T62 in the longitudinal direction. However, the width of each of the first driving transistor T52 and the second driving transistor T62 is also reduced. Therefore, in order to guarantee the performance of the gate driving circuit 300, the third driving transistor T54 and the fourth driving transistor T64 are not provided with the same design as the first driving transistor T52 and the second driving transistor T62, and the third driving transistor T54 and the fourth driving transistor T64 are disposed oppositely in the first direction Y.

In this embodiment, the sum of dimensions of the first driving transistor T52 and the second driving transistor T62 in the second direction X may be equal to the dimension of each of the third driving transistor T54 and the fourth driving transistor T64 in the second direction X.

In this embodiment, in order to ensure that the device performance of the first driving transistor T52 and the second driving transistor T62 is as close as possible to that of the third driving transistor T54 and the fourth driving transistor T64, the length of the first channel 240 or/and the length of the second channel 340 is/are less than the length of each of the third channel 270 and the fourth channel 280.

For example, the length of the first channel 240 is less than the length of each of the third channel 270 and the fourth channel 280, or the length of the second channel 340 is less than the length of each of the third channel 270 and the fourth channel 280, or the length of the first channel 240 and the length of the second channel 340 are less than the length of each of the third channel 270 and the fourth channel 280. The conduction rate of the corresponding driving transistor can be improved by reducing the length of the first channel 240 or/and the length of the second channel 340, thereby making the device performance of the first driving transistor T52 and the second driving transistor T62 to be same as that of the third driving transistor T54 and the fourth drive transistor T64.

It should be noted that the width of the first channel 240 of the first driving transistor T52 is the entire length of the first channel 240 in a shape of wave from left to right in FIG. 4 and FIG. 5. The length of the first channel 240 is the distance between adjacent first branch source 222 and first branch drain 232 in FIG. 4 and FIG. 5. The first channel 240 in FIG. 4 and FIG. 5 is merely a schematic diagram, and the specific length of the first channel 240 is the length of the region where the ion doping or the conducting process are not performed. Similarly, the widths and lengths of the second channel 340, the third channel 270, and the fourth channel 280 are defined in the same manner as the width and length of the first channel 240.

It should be noted that the third driving transistor T54 and the fourth driving transistor T64 can also be provided with the same configuration as the first driving transistor T52 and the second driving transistor T62 in FIG. 4, in which case the longitudinal dimensions of the third driving transistor T54 and the fourth driving transistor T64 are reduced, thereby further reserving a longitudinal space to arrange other devices.

It should be noted that in the structures of FIG. 4 and FIG. 5, the lateral metal lines at both sides of the driving transistors are all metal lines disposed in the same layer as the source and drain layer 125.

It should be noted that the stacked diagrams in FIG. 4 and FIG. 5 of the present disclosure are not structural diagrams of the final product. They are merely diagrams of stacked structures of film layers to facilitate the description of the technical solution of the present disclosure. Positions of different film layers may vary based on different transistor types.

It should be noted that the circuit structure in FIG. 2 is merely one of the embodiments listed in the present disclosure. As long as the two transistors are disposed oppositely in the first direction Y, it is applicable to the present disclosure.

The present disclosure also provides a mobile terminal, the mobile terminal includes a terminal body and the display panel 100 described above, and the terminal body and the display panel 100 are assembled together as a single unit. The terminal body may be a circuit board or other components bonded to the display panel, or a cover plate covering the display panel, or the like. The mobile terminal can include mobile phones, televisions, laptops and other electronic devices.

In the embodiments described above, each embodiment is described with its own emphasis. For parts that are not described in detail in a certain embodiment, reference can be made to relevant descriptions in other embodiments.

The display panel and the mobile terminal provided by embodiments of the present disclosure are described in detail in the above. Specific examples are used herein to illustrate the principles and implementations of the present disclosure. The description of the above embodiments is merely intended to help understand the technical solutions and their core ideas of the present disclosure. Those skilled in the art should understand that it is still possible to modify the technical solutions recorded in the embodiments described above, or to equivalently replace some of the technical features therein. However, these modifications or replacements do not cause the essence of the corresponding technical solutions to depart from the scope of the technical solutions of the embodiments of the present disclosure.

What is claimed is:

1. A display panel, comprising a display portion and a gate driving circuit disposed along a side of the display portion, wherein the gate driving circuit comprises N gate on array (GOA) units in cascade, the N GOA units are arranged along a first direction, and each of the N GOA units comprises a first driving transistor, a second driving transistor disposed adjacently along a second direction, and a source connecting portion extending along the first direction;

the first driving transistor comprises a first gate, a first source and a first drain, the first source comprises a first trunk source; the second driving transistor comprises a second gate, a second source and a second drain, the second source comprises a second trunk source; the first gate and the second gate are connected to a first control node, and the first source and the second source are connected to a second control node;

wherein the first source, the first drain, the second source and the second drain are disposed along the first direction, and the first source and the second source are disposed between the first drain and the second drain, the first source and the second source at least partially overlap in the second direction via the source connecting portion in between, a first end of the source connecting portion is electrically connected to an end of the first trunk source close to the source connecting portion, a second end of the source connecting portion is electrically connected to an end of the second trunk source close to the source connecting portion; and an included angle between the second direction and the first direction is greater than 0° and less than or equal to 90°.

2. The display panel according to claim 1, wherein each of the N GOA units comprises a pull-up control module, a pull-up module, a pull-down module and a pull-down holding module, and each of the pull-up control module, the pull-up module, the pull-down module and the pull-down holding module is connected to the first control node;

wherein the first driving transistor and the second driving transistor are disposed in the pull-down holding module.

3. The display panel according to claim 2, wherein the first source further comprises a plurality of first branch sources connected to the first trunk source and spaced apart, the second source further comprises a plurality of second branch sources connected to the second trunk source and spaced apart, the first trunk source and the second trunk source extend along the second direction, the plurality of first branch sources and the plurality of second branch sources extend along the first direction, and the plurality of first branch sources and the plurality of second branch sources are oriented in two different directions;

wherein the source connecting portion is disposed between the first source and the second source, the first end of the source connecting portion is electrically connected to the end of the first trunk source close to the plurality of second branch sources, and the second end of the source connecting portion is electrically connected to the end of the second trunk source close to the plurality of first branch sources.

4. The display panel according to claim 3, wherein in the first direction, a width dimension of the source connecting portion is greater than a width dimension of one of the plurality of first branch sources, and the width dimension of the source connecting portion is greater than a width dimension of one of the plurality of second branch sources.

5. The display panel according to claim 3, wherein the first drain comprises a first trunk drain and a plurality of first branch drains connected to the first trunk drain and spaced apart, the second drain comprises a second trunk drain and a plurality of second branch drains connected to the second trunk drain and spaced apart, the first trunk drain and the second trunk drain extend along the second direction, the plurality of first branch drains extend from the first trunk drain towards the first trunk source, the plurality of second branch drains extend from the second trunk drain towards the second trunk source, the plurality of first branch drains and the plurality of first branch sources are alternately disposed and sequentially spaced apart, and the plurality of second branch drains and the plurality of second branch sources are alternately disposed and sequentially spaced apart;

wherein the first driving transistor further comprises a first channel, the second driving transistor further comprises a second channel, the first channel covers a gap between the plurality of first branch drains and the plurality of first branch sources, and the second channel covers a gap between the plurality of second branch drains and the plurality of second branch sources.

6. The display panel according to claim 5, wherein each of the first gate and the second gate extends along the second direction, orthographic projections of the first channel, the first source and a part of the first drain on the first gate are within the first gate, and orthographic projections of the second channel, the second source and a part of the second drain on the second gate are within the second gate.

7. The display panel according to claim 3, wherein the display panel further comprises a first low potential line, the first low potential line is disposed at a side of the first driving transistor away from the second driving transistor, and the first low potential line extends along the first direction;

wherein the display panel further comprises a connecting section, a first terminal of the connecting section is electrically connected to the first trunk source in the first source, and a second terminal of the connecting section is electrically connected to the first low potential line.

8. The display panel according to claim 2, wherein the pull-down holding module further comprises a third driving transistor and a fourth driving transistor connected to the first control node, the third driving transistor and the fourth driving transistor are disposed adjacently along the first direction, and the third driving transistor and the fourth driving transistor are disposed at a side of the second driving transistor away from the first driving transistor;

wherein the third driving transistor comprises a third channel, the fourth driving transistor comprises a fourth channel, and the third channel and the fourth channel are disposed oppositely along the first direction.

9. The display panel according to claim 8, wherein the first driving transistor further comprises a first channel, the second driving transistor further comprises a second channel, and a length of the first channel or/and a length of the second channel is/are less than a length of each of the third channel and the fourth channel.

10. The display panel according to claim 8, wherein a sum of dimensions of the first driving transistor and the second driving transistor in the second direction is equal to a dimension of each of the third driving transistor and the fourth driving transistor in the second direction.

11. The display panel according to claim 1, wherein the display portion comprises a plurality of sub-pixel units, at least one pixel circuit is disposed in each of the plurality of sub-pixel units, and the first driving transistor and the second driving transistor are disposed in the at least one pixel circuit.

12. A mobile terminal, comprising a display panel, the display panel comprises a display portion and a gate driving circuit disposed along a side of the display portion, wherein the gate driving circuit comprises N gate on array (GOA) units in cascade, the N GOA units are arranged along a first direction, and each of the N GOA units comprises a first driving transistor, a second driving transistor disposed adjacently along a second direction, and a source connecting portion extending along the first direction;

the first driving transistor comprises a first gate, a first source and a first drain, the first source comprises a first trunk source; the second driving transistor comprises a second gate, a second source and a second drain, the second source comprises a second trunk source; the first gate and the second gate are connected to a first control node, and the first source and the second source are connected to a second control node;

wherein the first source, the first drain, the second source and the second drain are disposed along the first direction, and the first source and the second source are disposed between the first drain and the second drain, the first source and the second source at least partially overlap in the second direction via the source connecting portion in between, a first end of the source connecting portion is electrically connected to an end of the first trunk source close to the source connecting portion, a second end of the source connecting portion is electrically connected to an end of the second trunk source close to the source connecting portion; and an included angle between the second direction and the first direction is greater than 0° and less than or equal to 90°.

13. The mobile terminal according to claim 12, wherein each of the N GOA units comprises a pull-up control module, a pull-up module, a pull-down module and a pull-down holding module, and each of the pull-up control module, the pull-up module, the pull-down module and the pull-down holding module is connected to the first control node;

wherein the first driving transistor and the second driving transistor are disposed in the pull-down holding module.

14. The mobile terminal according to claim 13, wherein the first source further comprises a plurality of first branch sources connected to the first trunk source and spaced apart, the second source further comprises a plurality of second branch sources connected to the second trunk source and spaced apart, the first trunk source and the second trunk source extend along the second direction, the plurality of first branch sources and the plurality of second branch sources extend along the first direction, and the plurality of first branch sources and the plurality of second branch sources are oriented in two different directions;

wherein the source connecting portion is disposed between the first source and the second source, the first end of the source connecting portion is electrically connected to the end of the first trunk source close to the plurality of second branch sources, and the second end of the source connecting portion is electrically connected to the end of the second trunk source close to the plurality of first branch sources.

15. The mobile terminal according to claim 14, wherein in the first direction, a width dimension of the source connecting portion is greater than a width dimension of one of the plurality of first branch sources, and the width dimension of the source connecting portion is greater than a width dimension of one of the plurality of second branch sources.

16. The mobile terminal according to claim 14, wherein the first drain comprises a first trunk drain and a plurality of first branch drains connected to the first trunk drain and spaced apart, the second drain comprises a second trunk drain and a plurality of second branch drains connected to the second trunk drain and spaced apart, the first trunk drain and the second trunk drain extend along the second direction, the plurality of first branch drains extend from the first trunk drain towards the first trunk source, the plurality of second branch drains extend from the second trunk drain towards the second trunk source, the plurality of first branch drains and the plurality of first branch sources are alternately disposed and sequentially spaced apart, and the plurality of second branch drains and the plurality of second branch sources are alternately disposed and sequentially spaced apart;

wherein the first driving transistor further comprises a first channel, the second driving transistor further comprises a second channel, the first channel covers a gap between the plurality of first branch drains and the plurality of first branch sources, and the second channel covers a gap between the plurality of second branch drains and the plurality of second branch sources.

17. The mobile terminal according to claim 16, wherein each of the first gate and the second gate extends along the second direction, orthographic projections of the first channel, the first source and a part of the first drain on the first gate are within the first gate, and orthographic projections of the second channel, the second source and a part of the second drain on the second gate are within the second gate.

18. The mobile terminal according to claim 14, wherein the display panel further comprises a first low potential line, the first low potential line is disposed at a side of the first driving transistor away from the second driving transistor, and the first low potential line extends along the first direction;

wherein the display panel further comprises a connecting section, a first terminal of the connecting section is electrically connected to the first trunk source in the first source, and a second terminal of the connecting section is electrically connected to the first low potential line.

19. The mobile terminal according to claim 13, wherein the pull-down holding module further comprises a third driving transistor and a fourth driving transistor connected to the first control node, the third driving transistor and the fourth driving transistor are disposed adjacently along the first direction, and the third driving transistor and the fourth driving transistor are disposed at a side of the second driving transistor away from the first driving transistor;

wherein the third driving transistor comprises a third channel, the fourth driving transistor comprises a fourth channel, and the third channel and the fourth channel are disposed oppositely along the first direction.

20. The mobile terminal according to claim 19, wherein the first driving transistor further comprises a first channel, the second driving transistor further comprises a second channel, and a length of the first channel or/and a length of the second channel is/are less than a length of each of the third channel and the fourth channel.

* * * * *